United States Patent
Jarvis et al.

(10) Patent No.: US 9,505,254 B2
(45) Date of Patent: Nov. 29, 2016

(54) LAMINATED COLOR FORMING COMPOSITION

(71) Applicant: Tetra Laval Holdings & Finance S.A., Pully (CH)

(72) Inventors: Anthony Jarvis, Cheshire (GB); Chris Wyres, Cheshire (GB); Ladislav Hurdalek, Lund (SE); Marcus Rehberger, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 14/368,862

(22) PCT Filed: Dec. 12, 2012

(86) PCT No.: PCT/EP2012/075201
§ 371 (c)(1),
(2) Date: Jun. 26, 2014

(87) PCT Pub. No.: WO2013/098076
PCT Pub. Date: Jul. 4, 2013

(65) Prior Publication Data
US 2014/0342903 A1 Nov. 20, 2014

(30) Foreign Application Priority Data

Dec. 30, 2011 (SE) ...................................... 1151298

(51) Int. Cl.
*B41M 5/327* (2006.01)
*B41M 5/333* (2006.01)
(Continued)

(52) U.S. Cl.
CPC ........... *B41M 5/284* (2013.01); *B41M 5/3275* (2013.01); *B41M 5/3333* (2013.01);
(Continued)

(58) Field of Classification Search
CPC .. B41M 5/327; B41M 5/3275; B41M 5/333; B41M 5/3333; B41M 5/337; B41M 5/3375; B41M 5/3377; B41M 7/00; B41M 7/0027; B41M 2205/40

USPC ........................... 503/200–226; 427/150–152
See application file for complete search history.

(56) References Cited

U.S. PATENT DOCUMENTS

| 5,093,304 A | 3/1992 | Nakazawa et al. | |
| 8,101,545 B2 * | 1/2012 | Campbell | ................. C07F 7/04 |
| | | | 106/31.17 |

(Continued)

FOREIGN PATENT DOCUMENTS

| CN | 1246650 A | 3/2000 |
| CN | 101146878 A | 3/2008 |

(Continued)

OTHER PUBLICATIONS

Office Action mailed on Apr. 30, 2015, in counterpart China Application No. 201280057797.8, by the State Intellectual Property Office of the People's Republic of China and English-language translation (15 Pages).

(Continued)

*Primary Examiner* — Bruce H Hess
(74) *Attorney, Agent, or Firm* — Finnegan, Henderson, Farabow, Garrett & Dunner, LLP

(57) ABSTRACT

A substrate coated with a markable ink formulation, comprising a thermo activated acid generator (TAG) and a halochromic leuco dye. The thermo activated acid generator is selected form the group consisting of: an amine salt of an organic metal compound comprising boron or silicone and amine neutralized polyalkylnaphthalene polysulphonic acid derivatives. Further, the substrate is covered by a thermoplastic polymer layer, such that the ink formulation is situated between the substrate and the thermoplastic polymer layer and/or in the thermoplastic polymer layer.

17 Claims, 1 Drawing Sheet

(51) Int. Cl.
  *B41M 5/337* (2006.01)
  *B41M 7/00* (2006.01)
  *B41M 5/28* (2006.01)
  *C09D 11/037* (2014.01)
  *C09D 11/50* (2014.01)
  *B65B 9/10* (2006.01)

(52) U.S. Cl.
  CPC ........ *B41M 5/3375* (2013.01); *B41M 5/3377* (2013.01); *B41M 7/0027* (2013.01); *C09D 11/037* (2013.01); *C09D 11/50* (2013.01); *B65B 9/10* (2013.01)

(56) References Cited

U.S. PATENT DOCUMENTS

| | | |
|---|---|---|
| 2005/0053863 A1 | 3/2005 | Gore |
| 2005/0224791 A1 | 10/2005 | Boyd |
| 2007/0269740 A1 | 11/2007 | Blank et al. |
| 2009/0071367 A1 | 3/2009 | Campbell et al. |
| 2011/0063392 A1 | 3/2011 | Wu et al. |
| 2011/0148092 A1 | 6/2011 | Jarvis et al. |
| 2011/0151384 A1 | 6/2011 | Walker et al. |
| 2012/0142527 A1* | 6/2012 | Smyth ................ G01N 31/225 503/201 |

FOREIGN PATENT DOCUMENTS

| | | | |
|---|---|---|---|
| CN | 101868507 A | 10/2010 | |
| JP | 2008-073893 | * 3/2008 | ............ B41M 5/333 |
| WO | 9516620 A1 | 6/1995 | |
| WO | 2006108745 A1 | 10/2006 | |
| WO | 2008024537 A2 | 2/2008 | |
| WO | WO-2008024537 A2 | 2/2008 | |
| WO | 2010029331 A2 | 3/2010 | |
| WO | WO-2010029331 A2 | 3/2010 | |
| WO | 2010029276 A1 | 10/2010 | |
| WO | 2012160084 A1 | 11/2012 | |

OTHER PUBLICATIONS

International Search Report issued Feb. 1, 2013 in International Application No. PCT/EP2012/075201 (4 pages).

International-Type Search Report issued Jun. 12, 2012 in Sweden Application No. 1151298-5 including English translation (10 pages).

* cited by examiner

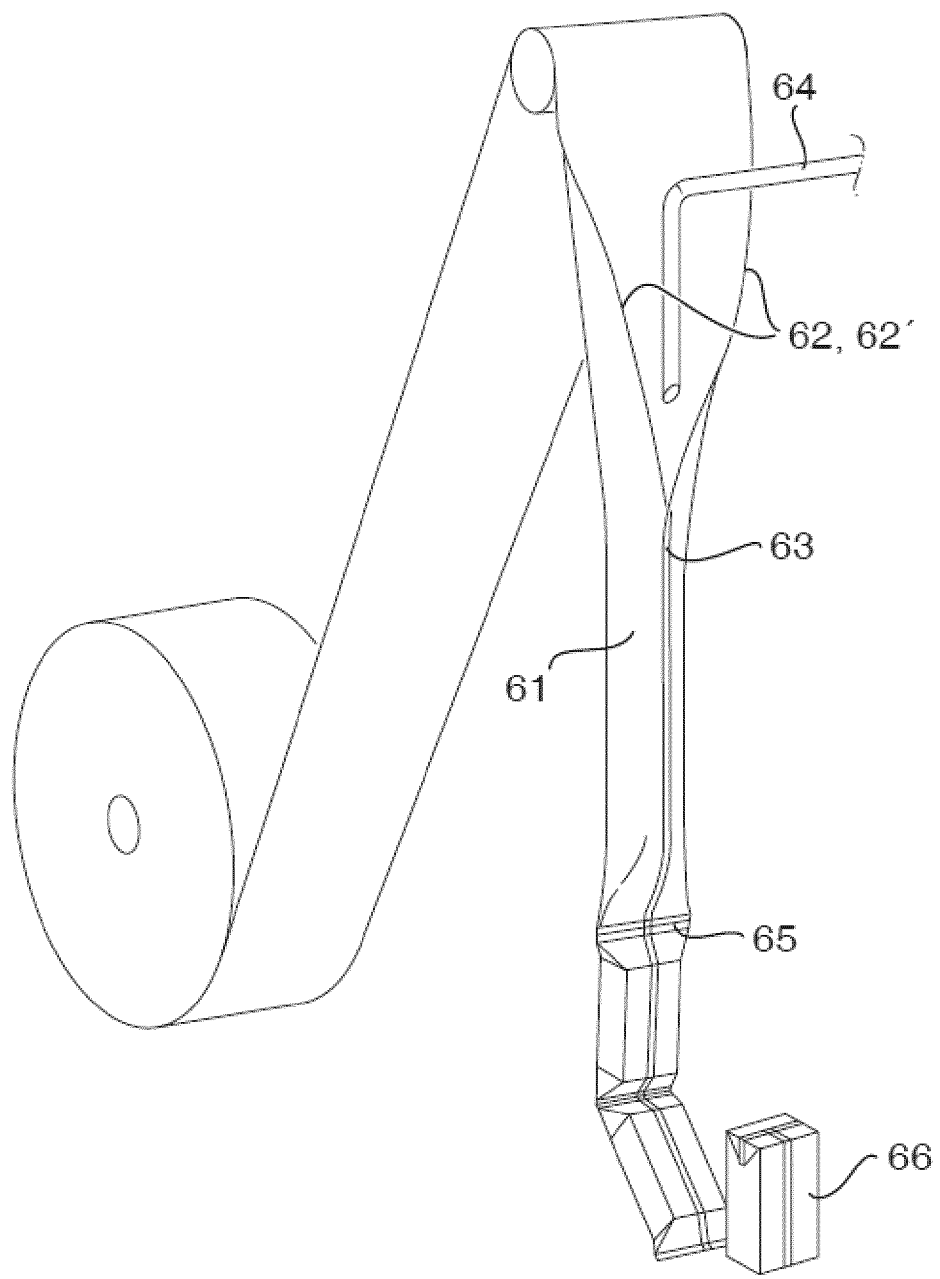

LAMINATED COLOR FORMING COMPOSITION

CROSS REFERENCE TO RELATED APPLICATIONS

This is a U.S. National Phase Application of International Application No. PCT/EP2012/075201, filed Dec. 12, 2012, which claims the benefit of priority to Sweden Patent Application No. 1151298-5, filed Dec. 30, 2011, all of which are incorporated herein by reference.

FIELD OF THE INVENTION

The present invention relates to a markable substrate coated with an ink formulation, the ink formulation being covered by a thermoplastic polymer layer, such that the ink formulation is situated between the substrate and the thermoplastic polymer layer and/or in the thermoplastic polymer layer, whereby the ink formulation is protected. Further, the present invention relates to a method for obtaining such a markable substrate and a method for marking, e.g. imaging, the substrate.

BACKGROUND

Various proposals have been made in the art for achieving effective marking of substrate, by causing a change of color in or on the substrate, on which the marking is to appear. In the art, various irreversible thermochromic marking components, i.e. activatable pigments, are disclosed. Substrates coated with such irreversible thermochromic marking components may be colored by application of heat, such as by lasers; thereby the coated substrate may be marked. Marking of a substrate with a laser or some other irradiation source, may be also denoted printing or imaging, as the laser and/or the substrate typically is moved during the process of marking the substrate.

As an example, WO 02/01250 discloses the use of oxymetal salts, such as ammonium octamolybdate (AOM), as marking component in laser marking. AOM is an example of a marking component that may be marked directly with 10,600 nm laser radiation. Laser radiation having a wavelength of about 10 μm may for example be obtained by use of mid-IR $CO_2$ lasers with an emission wavelength in the range 10,000 nm to 12,000 nm. However, mid-IR $CO_2$ lasers are less suitable for installation into existing production lines due to their physical bulk size.

An NIR fiber laser may have a small print-head fitted to the production line, connected to the laser, several meters away, via an umbilical cord. Thus, the disadvantage or mid-IR $CO_2$ lasers, being less suitable for installation into existing production lines due to their physical bulk size, may be overcome by use of a NIR (near infra-red) laser and by addition of a NIR-absorber to the ink formulation. The NIR-absorber will absorb near infra-red laser irradiation and convert it into conductive heat. Thus, ink formulations comprising a marking component, e.g. AOM, and a NIR-absorber may be marked by use of a NIR-laser instead of a mid-IR laser. A common example of a NIR-laser is Nd:YAG laser.

Leuco dyes are marking components that are colorless in one form, but may change into a colored form upon exposure to a particular stimulus. Most leuco dyes are halochromic, i.e. they respond to changes in pH, typically being colorless under alkaline conditions, but being colored in an acidic environment. The color change of halochromic leuco dye may occur when the leuco dye is protonated. Such protonation may result in changes in the conjugate systems of the leuco dye, thereby a conjugated system may be form, having ability to absorb photons of visible light, and therefore appearing colored.

By combining a halochromic leuco dye and a thermal acid generator (TAG) releasing protons upon heating, also halochromic leuco dye may be used in thermal marking, such as in laser imaging. A well known and effective TAG is benzylhydroxybenzoate, which in combination with various halochromic leuco dyes, provides ink formulation having good markability.

In certain applications there is a need for covering the substrate with a thermoplastic polymer layer. By covering the ink substrate with a thermoplastic polymer layer, certain properties of the substrate, such as the impermeability to liquids are improved. Further the thermoplastic polymer layer also protects the marking och the image. For packaging material, typically being a laminate including at least one layer of paper, cardboard, corrugated paper board, or paper board, the outermost layer, or one of the outer layers covering, the substrate is typically low-density polyethylene (LDPE)) or polypropylene melt extruded onto the laminate. For such polyolefins, a temperature of 200 to 340° C. is typically used in melt extruding the polyolefin.

As already described, marking components in the art are typically thermo activated. Typically, discoloration is thus seen, due to activation of the marking component, if such marking components are over laminated by melt extrusion. Accordingly, heat activated marking components are thus presently coated on top of the outermost layer of packaging material laminate, as said layer typically is a melt extruded polyolefin layer, in order to avoid discoloration prior to marking.

In order to protect the ink formulation, it would be desirable to have a markable ink formulation less prone to discoloration during over lamination by melt extrusion.

SUMMARY

Consequently, the present invention seeks to mitigate, alleviate, eliminate or circumvent one or more of the above-identified deficiencies in the art and disadvantages singly or in any combination by providing a substrate coated with an ink formulation, which ink formulation comprises a halochromic leuco dye and a thermo activated acid generator (TAG) selected form the group consisting of:

an amine salt of an organic metal compound comprising boron or silicone according to formula (I)

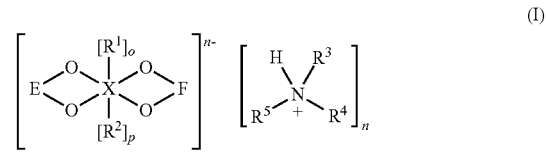

wherein

X is silicon or boron;

"n" is an integer of 1 to 5;

"o" is an integer being 0 (zero) or 1;

"p" is an integer being 0 (zero) or 1;

E and F are individually selected from the group consisting of

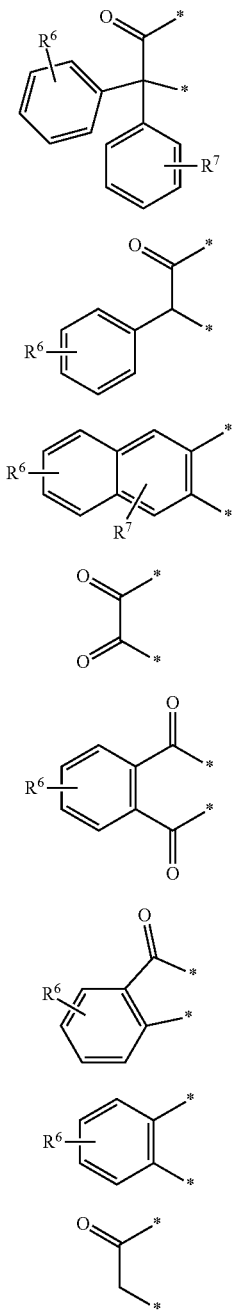

wherein each $R^6$ and $R^7$ are individually selected from the group consisting of hydrogen, $C_{1-4}$-alkyl, $C_{1-4}$-alkoxy, halogen, amino and carboxy;

whenever X=silicon, then o=1, p=0, and R1 is aryl, aralkyl or $C_{1-4}$-alkyl, or o=1, p=1, and $R^1$ and $R^2$ together form a residue selected from the group consisting of a, b, c, d, e, f, g and h;

whenever X=boron, then o=0 and p=0; and $R^3$, $R^4$ and $R^5$ are individually selected from the group consisting of hydrogen, $C_{1-12}$-alkyl, $C_{1-6}$-hydroxyalkyl, allyl, aralkyl and arylsulfonyl, in which aralkyl or arylsulfonyl may be substituted with $C_{1-4}$-alkyl; or R3 and R4 together with the nitrogen to which they are attached form a morpholino or piperidino ring, and $R^5$ is selected from the group consisting of hydrogen, $C_{1-12}$-alkyl, $C_{1-6}$-hydroxyalkyl, allyl, aralkyl and arylsulfonyl, in which aralkyl or arylsulfonyl can be substituted with $C_{1-4}$-alkyl; and amine neutralized polyalkylnaphthalene polysulphonic acid derivatives; wherein said substrate is covered by a thermoplastic polymer layer, such that the ink formulation is situated between the substrate and the thermoplastic polymer layer and/or in the thermoplastic polymer layer.

A further aspect of the invention relates to a liquid food packaging material. The liquid food packaging material comprises an innermost polyolefin layer to be in contact with the liquid food, such a substrate as described herein, and a barrier layer, such as an oxygen barrier layer arranged between the innermost polyolefin layer and the substrate. The thermoplastic polymer layer of the substrate is the outermost layer of the liquid food packaging material. An additional aspect, the invention relates to a liquid food package comprising such a liquid food packaging material.

A further aspect of the invention relates to a method for obtaining such a substrate. Such a method comprises the steps of:

providing a substrate;

coating said substrate with such an ink formulation as described herein above; and covering said coated substrate with a thermoplastic polymer layer, such that the ink formulation becomes situated between the substrate and the thermoplastic polymer layer and/or in the thermoplastic polymer layer.

A further aspect of the invention relates method for obtaining a markable substrate, said substrate being coated with an ink formulation comprising a thermo activated acid generator (TAG) and a halochromic leuco dye, said substrate further being covered by a thermoplastic polymer layer, such that the ink formulation is situated between the substrate and the thermoplastic polymer layer and/or in the thermoplastic polymer layer. In such a method, a substrate is provided. The substrate is coated with an ink formulation comprising a thermo activated acid generator (TAG) and a halochromic leuco dye. Subsequently, the ink formulation is covered by a thermoplastic polymer layer. In such a method, the thermo activated acid generator (TAG) and the halochromic leuco dye are selected such that the color difference, i.e. $\Delta E^*_{ab} = \sqrt{(L_2^* - L_1^*)^2 + (a_2^* - a_1^*)^2 + (b_2^* - b_1^*)^2}$, according to the 1976 CIE (L*, a*, b*) space, resulting from the step of covering said ink formulation with a thermoplastic polymer layer, is less than 4, and that marking with an ODB of at least 0.7 may be achieved by irradiating the substrate with an laser having an operating wavelength in the range 780 to 2500 nm.

A further aspect of the invention relates to a substrate obtainable by a method disclosed herein, which substrate may be marked to obtain a marking with an ODB of at least 0.7 by irradiating the substrate with an laser having an operating wavelength in the range 780 to 2500 nm.

A further aspect of the invention relates to a method for marking such a substrate as described herein above. Such a method comprises the steps of:

irradiating those parts of the coated substrate, where a marking is intended, in order to generate a marking.

Further advantageous features of the invention are defined in the dependent claims. In addition, advantageous features of the invention are elaborated in embodiments disclosed herein.

DETAILED SUMMARY OF PREFERRED EMBODIMENTS

It has been found that certain thermal acid generators may be used to obtain ink formulations, comprising a halochromic leuco dye, which only are discolored to a low extent during coverage by melt extrusion of a polyolefin, such as low-density polyethylene (LDPE), at about 300° C. Further, it has surprisingly been found that such ink formulations anyhow may be efficiently activated to mark the substrate without disrupting the thermoplastic polymer layer overlaying the ink formulation. Exposure to temperatures exceeding 340° C. would normally degrade LDPE Such ink formulations are therefore well suited for use in substrates, such as packing materials.

An embodiment thus relates to a substrate coated with an ink formulation comprising a halochromic leuco dye and a thermo activated acid generator (TAG) selected form the group consisting of:

an amine salt of an organic metal compound comprising boron or silicone according to formula (I)

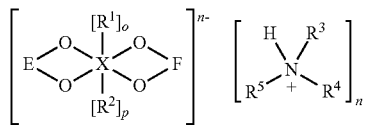

wherein
X is silicon or boron;
"n" is an integer of 1 to 5, preferably 1 or 2;
"o" is an integer being 0 (zero) or 1;
"p" is an integer being 0 (zero) or 1;
E and F individually are selected from the group consisting of

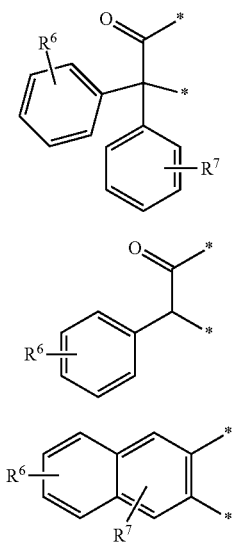

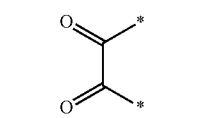

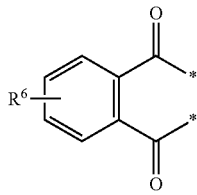

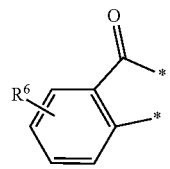

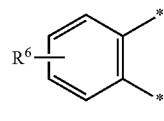

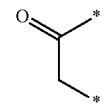

wherein each $R^6$ and $R^7$ are individually selected from the group consisting of hydrogen, $C_{1-4}$-alkyl, $C_{1-4}$-alkoxy, halogen, amino and carboxy; preferably $R^6$ and $R^7$ are hydrogen;

whenever X=silicon, then o=1, p=0, and R1 is aryl, aralkyl or $C_{1-4}$-alkyl, or o=1, p=1, and $R^1$ and $R^2$ together form a residue selected from the group consisting of a, b, c, d, e, f, g and h;

whenever X=boron, then o=0 and p=0; and $R^3$, $R^4$ and $R^5$ are individually selected from the group consisting of hydrogen, $C_{1-12}$-alkyl, $C_{1-6}$-hydroxyalkyl, allyl, aralkyl and arylsulfonyl, in which aralkyl or arylsulfonyl may be substituted with $C_{1-4}$-alkyl; or R3 and R4 together with the nitrogen to which they are attached form a morpholino or piperidino ring, and $R^5$ is selected from the group consisting of hydrogen, $C_{1-12}$-alkyl, $C_{1-6}$-hydroxyalkyl, allyl, aralkyl and arylsulfonyl, in which aralkyl or arylsulfonyl can be substituted with $C_{1-4}$-alkyl; and amine neutralized polyalkylnaphthalene polysulphonic acid derivatives;

wherein said substrate is covered by a thermoplastic polymer layer, such that the ink formulation is situated between the substrate and the thermoplastic polymer layer and/or in the thermoplastic polymer layer.

According to an embodiment, alkyl, as used herein, is intended to mean a straight or branched saturated hydrocarbon radical. Further, according to an embodiment, alkoxy is intended to mean an —O-alkyl group. Aralkyl is, according to an embodiment, intended to mean alkandiylaryl. Additionally, arylsulfonyl is, according to an embodiment, intended to mean an —$SO_2$ aryl group. Aryl, as used herein, is, according to an embodiment, intended to mean a carbocyclic (all carbon) ring or two or more fused carbocyclic rings (rings that share two adjacent carbon atoms) that have a fully delocalized pi-electron system. According to an embodiment, carboxy, as used herein, is intended to mean a —COOH or a —COO⁻ group. According to an embodiment, amino, as used herein, is intended to mean an —NH$_2$. In some embodiments, amino may further include —NHC$_{1-4}$ alkyl, as well as —N(C$_{1-4}$ alkyl)$_2$. According to an embodiment, haloalkyl, as used herein, is intended to mean a straight or branched saturated hydrocarbon radical, wherein at least one hydrogen atom has been replaced with a halogen, such as fluoro.

As used herein, the integers "x1" and "x2" in "C$_{x1-x2}$ refer to the number of carbon atoms in the relevant group, i.e. the group contains from "x1" to "x2" carbon atoms. For example a "C$_{1-4}$ alkyl" group refers to all alkyl groups having from 1 to 4 carbons, that is, CH$_3$—, CH$_3$CH$_2$—, CH$_3$CH$_2$CH$_2$—, (CH$_3$)$_2$CH—, CH$_3$CH$_2$CH$_2$CH$_2$—, CH$_3$CH$_2$CH(CH$_3$)— and (CH$_3$)$_3$C—.

Examples of C$_{1-4}$-alkyl are methyl, ethyl, propyl, isopropyl, butyl, sec-butyl, isobutyl and tert-butyl; examples for C$_{1-4}$-alkoxy are methoxy, ethoxy, propoxy, isopropoxy, butoxy, sec-butyoxy, isobutoxy and tert-butoxy; examples of halogen are chlorine, bromine, fluorine, and iodine; examples of aryl are phenyl, 1-naphthyl, 2-naphthyl and pyridyl; examples of aralkyl are benzyl and 2-phenylethyl; examples of C$_{1-12}$-alkyl are methyl, ethyl, propyl, isopropyl, butyl, sec-butyl, isobutyl and tert-butyl, pentyl, hexyl, heptyl, octyl, 2-ethylhexyl, nonyl, decyl, undecyl and dodecyl; examples of C$_{1-6}$-hydroxyalkyl are hydroxy methyl, 2-hydroxyethyl, 2-hydroxypropyl, 3-hydroxypropyl, 4-hydroxybutyl, 5-hydroxypentyl and 6-hydroxyhexyl; and examples of arylsulfonyl are phenylsulfonyl and tosyl.

According to an embodiment, the thermo activated acid generator (TAG) is an amine salt of an organic metal compound comprising boron or silicone according to formula (I). Such salts have been disclosed in WO 2006/108745.

Preferably, R6 and R7 are hydrogen. Furthermore, R$^3$, R$^4$ and R$^5$ are preferably and individually selected from the group consisting of hydrogen, C$_{1-12}$-alkyl, and allyl; or R$^3$ and R$^4$ together with the nitrogen to which they are attached form a morpholino or piperidino ring, and R$^5$ is selected from the group consisting of hydrogen, C$_{1-12}$-alkyl, and allyl. Preferred examples of amine salts of organic metal compound comprising boron are salts according to formula (I), wherein E and F individually are selected from the group consisting of a, b, f, g, and h, such as from a, b and g. Preferred examples of amine salts of organic metal compound comprising silicon are salts according to formula (I), wherein E and F individually are selected from the group consisting of a, b, c, d, and e, such as from a, b, and c. Whenever X=silicon, o=1, and p=0, then it is preferred for R$^1$ to be phenyl.

As an example of groups of E and F, a may be a residue of benzilic acid, b may be a residue of mandelic acid, and c may be residue of naphthalene-2,3-diol. Further, R6 and R7 may be hydrogen in such examples.

Typical examples of compounds according to formula (I) are the following:

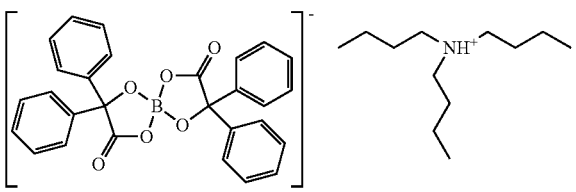

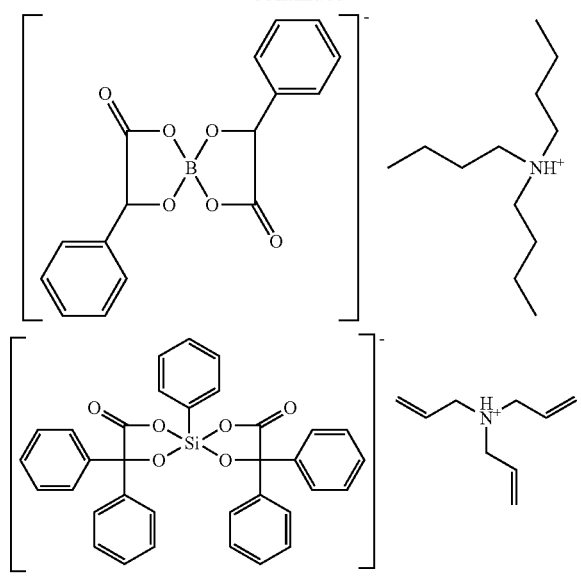

According to an embodiment, the thermo activated acid generator (TAG) is amine neutralized polyalkylnaphthalene polysulphonic acid derivative. Examples of such derivatives have been disclosed in WO 10/029,331. Further, such derivatives have, according to WO 10/029,331, been disclosed in U.S. Pat. No. 5,187,019 and U.S. Pat. No. 4,251,665.

The polyalkylnaphthalene polysulphonic acid of the polyalkylnaphthalene polysulphonic acid derivative may be a polyalkylnaphthalene polysulphonic acid according to formula (II)

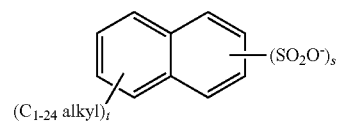

wherein

"t" is an integer of 2 to 6, such as 2;

"s" is an integer of 2 to 6, such as 2;

each C$_{1-24}$ alkyl is the same type of alkyl or a different alkyl; and each C$_{1-24}$ alkyl and —SO$^{3-}$, respectively, is connected to any substitutable carbon atom of the naphthalene.

According to an embodiment, the amine neutralizing the polyalkylnaphthalene polysulphonic acid typically comprises a nitrogen atom capable of protonation.

Preferred examples of such amines include ammonium, anilino, oxazolidine and bicyclic oxazolidine salts.

Ammonium compounds useful in this regard may have the following general formula (III):

NR$_{13}$R$_{14}$R$_{15}$H$^+$ (III)

wherein R$_{13}$, R$_{14}$ and R$_{15}$ are each independently selected from hydrogen, C$_{1-24}$ alkyl, which may be branched or linear, or hydroxy C$_{1-10}$ alkandiyl. Preferred examples of ammonium compounds include triethanolammonium and N,N-dimethylhydroxyethylammonium compounds.

Anilino compounds useful in the present invention may have the following general formula (IV):

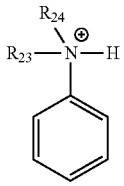

wherein $R_{23}$ and $R_{24}$ each are independently selected from hydrogen, $C_{1-24}$ alkyl, which may be branched or linear, or hydroxy $C_{1-10}$ alkandiyl.

Suitable bicyclic oxazolidines may have the general formula (V):

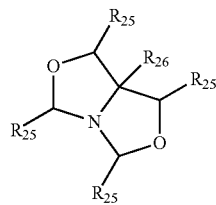

wherein
each $R_{25}$ is independently selected from the group consisting of hydrogen, $C_{1-6}$ alkyl, and hydroxy $C_{1-6}$ alkandiyl; and
$R_{26}$ is hydrogen, $C_{1-6}$ alkyl, or hydroxy $C_{1-6}$ alkylen.

Preferably $R_{25}$ is hydrogen and $R_{26}$ is $C_{1-6}$ alkyl or hydroxy methylene (—$CH_2OH$). The most preferred bicyclic oxazolidine is 1-aza-3,7-dioxa-5-ethylbicyclo (3.3.0) octane.

Suitable oxazolidine compounds include oxa-azacyclopentane compounds having the general formula (VI)

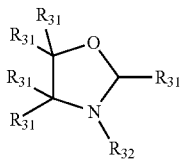

wherein
each $R_{31}$ independently are selected from the group consisting of hydrogen, $C_{1-6}$ alkyl, halogen, halo$C_{1-6}$ alkyl or $C_{1-6}$ alkoxy; and
$R_{32}$ is hydrogen, $C_{1-6}$ alkyl, halogen, halo $C_{1-6}$ alkyl or $C_{1-6}$ alkoxy.

The preferred oxa-azacyclopentane is 4,4-dimethyl-1-oxa-3-aza-cyclopentane.

The polyalkylnaphthalene polysulphonic acid and neutralizing amine may form adducts at varying molar ratios which will depend on the particular compounds employed and their properties. For example, the molar ratio of sulphonic groups of the polyalkylnaphthalene polysulphonic acid to bicyclic oxazolidines or oxa-azacyclopentane may range from about 0.5 to about 1.5. The most preferred molar ratio is about 1.0.

It is preferred that the pH of the amine neutralised polyalkylnaphthalene polysulphonic acid (in water) is greater than or equal to 6.5. Typically, the pH is in the range 6.5 to 8.0.

Amine neutralised polyalkylnaphthalene polysulphonic acids suitable for use in ink formulations disclosed herein are obtainable from King Industries, Inc. under the name Nacure™

Various halochromic leuco dyes may be employed in the ink formulation. In WO 06/108745 examples of leuco dyes are given. Examples of halochromic leuco dyes include phthalides, fluorans, triaryllmethanes, benzoxazines, quinazolines, spiropyrans, quinones, thiazines, oxazines and mixtures thereof.

Among various existing examples of phthalides may be mentioned crystal violet lactone (3,3-bis(p-dimethylaminophenyl)-6-dimethyl-aminophtalide), 3,3-bis(p-dimethylaminophenyl)phthalide, 3,3-bis(1-ethyl-2-methylindol-3-yl) phthalide, 3,3-bis(1-octyl-2-methylindol-3-yl)phthalide (sold for example under the tradename Ciba® Pergascript® Red I 6 B), 3-(4-diethylaminophenyl)-3-(1-ethyl-2-methyl-indol-3-yl)-phthalide, 7-(N-ethyl-N-isopentylamino)-3-methyl-1-phenylspiro[4H-chromeno-[2,3-c]pyrazole-4 (1H)-3' phthalide, 3,6,6'-tris(dimethylamino)spiro[fluorene-9,3'-phthalide], 3,6,6'-tris(diethylamino)spiro[fluorene-9,3'-phthalide], 3,3-bis-[2-(p-dimethylaminophenyl)-2-(p-methoxyphenyl)ethenyl-4,5,6,7-tetrabromophthalide, 3,3-bis-[2-(p-dimethylamino-phenyl)-2-(p-methoxyphenyl) ethenyl-4,5,6,7-tetrachlorophthalide, 3,3-bis[1,1-bis(4-pyrrolidinophenyl)ethylene-2-yl]-4,5,6,7-tetrabromophthalide, 3,3-bis-[1-(4-methoxyphenyl)-1-(4-pyrridinophenyl)ethylene-2-yl]-4,5,6,7-tetrachlorophthalide, 3-(4-diethylamino-2-ethoxy-phenyl)-3-(1-ethyl-2-methylindol-3-yl)-4-azaphthalide, 3-(4-diethylamino-2-ethoxyphenyl)-3-(1-octyl-2-methylindol-3-yl)-4-azaphthalide and 3-(4-cyclohexylethylamino-2-methoxy-phenyl)-3-(1-ethyl-2-methylindol-3-yl)-4-azaphthalide. Phthalides may be prepared by methods known in the art, for example crystal violet lactone can be prepared as described in GB 1,347,467, and 3,3-bis(1-ethyl-2-methylindol-3-yl)phthalide can be prepared as described in GB 1,389,716.

Among various existing examples of fluorans may be mentioned 3-di(ethyl)amino-6-methyl-7-(tert-butoxycarbonyl)anilinofluoran, 3-diethylamino-7-dibenzylaminofluoran, 3-dibutylamino-7-dibenzylaminofluoran, 3-diethyl-amino-6-methyl-7-(dibenzylamino)fluoran, 3-diethylamino-6-methylfluoran, 3-diethylamino-6-chloro-7-methylfluoran, 3-diethylamino-6-methyl-7-chlorofluoran, 3-diethylamino-7-tert-butylfluoran, 3-diethylamino-7-(ethoxycarbonyl)-fluoran (as sold for example under the tradename Ciba® Pergascript® Orange IG), 3-diethylamino-7-methylfluoran, 3-diethylamino-6,8-dimethylfluoran, 3-diethylamino-7-chlorofluoran, 3-dibutylamino-6-methylfluoran, S-cyclohexylamino-[theta]-chlorofluoran, 3-diethylamino-benzo[a] fluoran, 3-diethylamino-benzo[c]fluoran, 3-dimethylamino-6-methyl-7-anilinofluoran, 3-diethylamino-6-methyl-7-anilinofluoran, 3-diethylamino-6-methyl-7-(2,4-dimethylanilino)fluoran, 3-diethylamino-6-methyl-7-(3-trifluoromethylanilino)-fluoran, 3-diethylamino-6-methyl-7-(2-chloroanilino)-fluoran, 3-diethylamino-6-methyl-7-(p-chloroanilino)fluoran, 3-diethylamino-6-methyl-7-(2-fluoroanilino)fluoran, 3-diethylamino-6-methyl-7-(p-octylanilino)fluoran, 3-diethylamino-7-(p-octylanilino) fluoran, 3-diethylamino-6-methyl-7-(p-methylanilino) fluoran, 3-diethylamino-6-ethoxyethyl-7-anilinofluoran, 3-diethylamino-6-methyl-7-(3-methylanilino)fluoran, 3-diethyl-amino-7-(3-trifluoromethylanilino)fluoran, 3-diethylamino-7-(2-chloroanilino)fluoran, 3-diethyl-amino-7-(2-fluoroanilino)fluoran, 3-diethylamino-6-chloro-7-anilinofluoran, 3-dibutylamino-6-methyl-7-anilinofluoran (as sold for example under the tradename Ciba® Pergascript® Black I-2R), 3-dibutylamino-6-methyl-7-(2,4-dimethylanilino)fluoran, 3-dibutylamino-6-methyl-7-(2-chloroanilino)fluoran, 3-dibutylamino-6-methyl-7-(4-chloroanilino)fluoran, 3-dibutylamino-6-methyl-7-(2-fluoroanilino)fluoran, 3-dibutylamino-6-methyl-7-(3-trifluoromethyl-anilino)fluoran, 3-dibutylamino-6-ethoxyethyl-7-anilinofluoran, 3-dibutylamino-6-chloro-anilinofluoran, 3-dibutylamino-6-methyl-7-(4-methylanilino)-fluoran, 3-dibutylamino-7-(2-chloroanilino)fluoran, 3-dibutylamino-7-(2-fluoro-anilino)fluoran, 3-dipentylamino-6-methyl-7-anilinofluoran, 3-dipentylamino-6-methyl-7-(4-2-chloroanilino)fluoran, 3-dipentyl-amino-7-(3-trifluoromethylanilino)-fluoran, 3-dipentylamino-6-chloro-7-anilinofluoran, 3-dipentylamino-7-(4-chloro-anilino)fluoran, 3-pyrrolidino-6-methyl-7-anilinofluoran, 3-piperidino-6-methyl-7-anilinofluoran, 3-(N-methyl-N-propylamino)-6-methyl-7-anilinofluoran, 3-(N-methyl-N-cyclohexylamino)-6-methyl-7-anilinofluoran, 3-(N-ethyl-N-cyclohexylamino)-6-methyl-7-anilinofluoran, 3-(N-ethyl-N-hexylamino)-7-anilinofluoran, 3-(N-ethyl-p-toluidino)-amino-6-methyl-7-anilinofluoran, 3-(N-ethyl-p-toluidino)amino-7-methylfluoran, 3-(N-ethyl-N-isoamylamino)-6-methyl-7-anilinofluoran, 3-(N-ethyl-N-isoamylamino)-7-(2-chloroanilino)-fluoran, 3-(N-ethyl-N-isoannylamino)-6-chloro-7-anilinofluoran, 3-(N-ethyl-N-tetrahydrofurfuryl-amino)-6-methyl-7-anilinofluoran, 3-(N-ethyl-N-isobutylamino)-6-methyl-7-anilinofluoran, 3-(N-butyl-N-isoamylanilino)-6-nnethyl-7-anilinofluoran, 3-(N-isopropyl-N-3-pentylamino)-6-methyl-7-anilinofluoran, 3-(N-ethyl-N-ethoxypropylamino)-6-methyl-7-anilinofluoran, 2-methyl-6-p-(p-dimethylaminophenyl)aminoanilinofluoran, 2-methoxy-6-p-(p-dimethyl-aminophenyl)-amino-anilinofluoran, 2-chloro-3-methyl-6-p-(p-phenylaminophenyl)amino-anilinofluoran, 2-diethylamino-6-p-(p-dimethylaminophenyl)aminoanilinofluoran, 2-phenyl-6-methyl-6-p-(p-phenylaminophenyl)amino-anilinofluoran, 2-benzyl-6-p-(p-phenylamino-phenyl)aminoanilinofluoran, 3-methyl-6-p-(p-dimethylaminophenyl)-aminoanilinofluoran, 3-diethylamino-6-p-(p-diethylaminophenyl)aminoanilinofluoran, 3-diethylamino-6-p-(p-dibutyl-aminophenyl)aminoanilinofluoran and 2,4-dimethyl-6-[(4-dimethylamino)anilino]fluoran. Fluorans may be prepared by methods known in the art, for example 3-diethylamino-7-di-benzylaminofluoran, 3-diethylamino-7-tert-butylfluoran, 3-diethylamino-6-methyl-7-anilino-fluoran and 3-diethylamino-6-methyl-7-(2,4-dimethyl-anilino)fluoran and can be prepared as described in U.S. Pat. No. 5,166,350 A, 3-diethylamino-6-methyl-7-(3-methyl-anilino)fluoran can be prepared as described in EP 0 546 577 A1, 3-diethylamino-6-chloro-7-anilinofluoran can be prepared as described in DE 2130845, 3-pyrrolidino-6-methyl-7-anilinofluoran and 3-piperidino-6-methyl-7-anilinofluoran can be prepared as described in U.S. Pat. No. 3,959,571A, 3-(N-ethyl-N-isoamylamino)-6-methyl-7-anilinofluoran can be prepared as described in GB 2 002 801 A, and 3-(N-methyl-N-propylamino)-6-methyl-7-anilinofluoran can be prepared as described in GB 2,154,597 A.

Among various existing examples of benzoxazines may be mentioned 2-phenyl-4-(4-diethylaminophenyl)-4-(4-methoxyphenyl)-6-methyl-7-dimethylamino-3,1-benzoxazine, which can be prepared as described in EP 0 187 329 A1, and 2-phenyl-4-(4-diethylaminophenyl)-4-(4-methoxyphenyl)-8-methyl-7-dimethylamino-3,1-benzoxazine. An example of a quinazoline is 4,4'-[1-methylethylidene)bis(4,1-phenyleneoxy-4,2-quinazolinediyl)]bis[N,N-diethylbenzeneamine]. An example of a triarylmethane is bis(N-methyldi-phenylamine)-4-yl-(N-butylcarbazole)-3-yl-methane, which can be prepared as described in GB 1,548,059.

Among various existing examples of spiropyrans may be mentioned 1',3',3'-trimethylspiro[2H-1-benzopyran-2,2'-indoline], 1,3,3-tri-methylspiro[indoline-2,3'-[3H]naphth[2,1-b][1,4]oxazine] and 1',3',3'-trimethylspiro-[2H-1-benzothiopyran-2,2'-indoline]. An example of a quinone is hematoxyline and an example of an oxazine is 3,7-bis(dimethyl-amino)-10-benzoylphenoxazine. An example of a thiazine is 3,7-bis(dimethylamino)-10-benzoylphenothiazine.

The halochromic leuco dye may be a phthalide, a fluoran or mixtures thereof. Additionally the halochromic leuco dye may be, 3,3-bis(1-octyl-2-methylindol-3-yl)phthalide (sold for example under the trade name Ciba® Pergascript® Red I 6 B), 3-di-ethylamino-7-(ethoxycarbonyl)-fluoran (as sold for example under the trade name Ciba® Pergascript® Orange IG) or 3-dibutylamino-6-methyl-7-anilinofluoran (as sold for example under the trade name Ciba® Pergascript® Black I-2R). Another leuco dye is 2'-anilino-6'-[ethyl(p-tolyl)amino]-3'-methylspiro[isobenzofuran-1(3H), 9'-[9H]xanthene]-3-one, known commercially as ETAC (ex. Yamada Chemical Co. Ltd).

According to an embodiment, the halochromic leuco due is a fluoran, such as 2'-anilino-6'-[ethyl(p-tolyl)amino]-3'-methylspiro[isobenzofurana-1(3H), 9'-[9H]xanthene]-3-one.

Various amounts of TAG and Leuco dye, respectively, may be used. The ink formulation may comprise 5 to 40 wt. %, such as 10 to 30 wt. %, of the leuco dye. Further, ink formulation may comprise 5 to 50 wt. %, such as 10 to 40 wt. %, of the TAG. The weight ratio of leuco dye:TAG may be 1:1 to 1:5, such as 1:2 to 1:5, or 1:1 to 1:3.

As use of NIR-lasers for activating the ink formulation are advantageous in certain applications, such as installation into existing production lines, the ink formulation may, according to an embodiment, further comprise a near infra reed absorber. The ink formulation may comprise 0.1 to 10 wt %, such as 0.25 to 5 wt % of a near infra red absorber.

Various types of NIR-absorbers are known within the art and examples of such comprise:
  Organic dye/pigment types. Examples of such NIR-absorbers are for example disclosed in U.S. Pat. No. 6,911,262 and WO 2008/050153;
  Stoichiometric inorganic pigment types, such as Copper salts, e.g. copper (II) hydroxyl phosphate. Examples of this type of NIR-absorbers are disclosed in WO 2005/068207; and
  Conductive polymers. Conductive polymers are materials that, in the polymerized state, comprise linked monomers (typically rings) that are conjugated and which can therefore allow delocalisation/conduction of positive or negative charge. Examples his type of NIR-absorbers are disclosed in WO 2005/012442

Further examples of NIR-absorbers are disclosed in WO 2005/012442, WO 2005/068207, WO 2007/141522 and WO 2008/050153.

A preferred type of NIR-absorber is disclosed in WO 2007/141522. In said publication various types of non-stoichiometric inorganic pigment types are disclosed. Non-stoichiometric refers to the fact that the ratio of elements in the compound may not be represented by integers. A preferred example of non-stoichiometric inorganic NIR-absorber is reduced indium tin oxide (r-ITO).

According to an embodiment, the ink formulation comprises reduced indium tin oxide, typically in the form of a nanopowder. Reduced indium tin oxide is a non-stoichiometric compound, comprising indium oxide doped with tin oxide, which doped indium oxide has been reduced. Reduction of indium tin oxide removes of oxygen, thus leaving an excess of indium and/or tin in the zero oxidation state, i.e. metallic indium and/or tin. Without being bond to any theory, it is believed to create a free electron that is free to migrate through the solid lattice. This free electron bestows electrical conductivity properties and, in the case of r-ITO NIR absorption properties.

According to an embodiment, the reduced indium tin oxide (r-ITO) in the ink formulation is r-ITO in powder form exhibiting a lightness (L*), according to the 1976 CIE (L*, a*, b*) space, of not more than 50. Preferably, the r-ITO in powder form exhibits a lightness (L*), according to the 1976 CIE (L*, a*, b*) space, of at least 20.

The 1976 CIE (L*, a*, b*) space, is a color model adopted in 1976 by CIE (Commision Internationale de lÉclairage; or in English The International Commission on Illumination). It is an opponent color system based on an earlier system of Richard Hunter, which was called L, a, b. Color opposition correlates with discoveries in the mid-1960s, indicating that somewhere between the optical nerve and the brain, retinal color stimuli are translated into distinctions between light and dark, red and green, and blue and yellow. In the 1976 CIE (L*, a*, b*) space color model, this is indicated by the values on three axes: L*, a*, and b*. The central vertical axis represents lightness (signified as L*) and its runs from 0 (black) to 100 (white). The color axes are based on the fact that a color can not be both red and green, or both blue and yellow, because these colors oppose each other. On each axis the values run from positive to negative, and on the a-axis, positive values indicate amounts of red while negative values indicate amounts of green. On the b-axis, positive values indicate amounts of yellow, while negative values indicate amounts of blue. For both axes, zero is neutral gray. As the 1976 CIE (L*, a*, b*) space is device independent, it has become very important and is used for color management. As an example, the 1976 CIE (L*, a*, b*) space is used as a device independent model of the ICC (International Color Consortium).

r-ITO is typically blue and does thus typically display negative a-values. When used in marking applications it should, in powder form, preferably have a lightness (L*) of not more than 50, as indicated above. Preferably, r-ITO for use in marking applications as disclosed herein should thus be dark, such as dark blue.

The lightness (L*) of a sample of r-ITO may be determined by colometry. As an example a SpectroEye spectrophotometer/densitometer from GretagMacbeth may be used. For determining the lightness (L*) of a sample of r-ITO, a powder cell may be used. Further, the following settings may be used: Illumination type: D65, D50 and TL84; Standard Observer: 2° or 10°. Preferably are the illumination type D65 and the standard observer 2°.

However, as indicated above, the 1976 CIE (L*, a*, b*) space is a device independent color model, thus also other spectrophotometers may be used to determine the color of a sample of r-ITO.

According to an embodiment, more than 0 molar %, such as at least 25 molar % or at least 50 molar %, of the tin in the reduced indium tin oxide (r-ITO), may be tin in the zero oxidation state. Further, less than 100 molar %, such as not more than 75 molar %, of the tin in the reduced indium tin oxide (r-ITO), may be tin in the zero oxidation state. In addition, more than 0 molar %, such as at least 5 molar %, but not more than 25 molar %, or at least 5 molar %, but not more than 15 molar %, of the indium in said reduced indium tin oxide (r-ITO), may be indium in the zero oxidation state.

While the lightness may be related to the degree of reduction, also other parameters, e.g. stoichiometry, particle size, contaminations, etc., may affect the lightness of r-ITO. As elaborated above, the present inventors have found that the lightness is a parameter being indicative for the markability of ink formulations comprising NIR-absorbers.

The reduced indium tin oxide is typically present in the form of particles, i.e. as a powder. Particles of reduced indium tin oxide may have a median particle size in the range from 10 nm to 10 µm. Further, the particles may be nanoparticles and the median particle size may accordingly be less than 1 µm, such as less than 250 nm. Nanoparticles may have a median particle size of at least 10 nm. Decreasing the particle size will enhance the NIR-absorbing properties.

According to an embodiment, the median particle size is determined in accordance with ISO Standard 9276-2 or 9276-5. Further, the particles may have a volume based particle size of 10 nm to 10 µm, such as less than 1 µm or even less than 250 nm. The volume based particle size may be at least 10 nm.

It will be appreciated by one of ordinary skill in the art that it is possible to incorporate additives of various sorts in the ink formulation, and which might be beneficial in certain circumstances. Such additives include, for example, polymer binders, mild reducing agents to promote thermal printer performance, colorants such as dyes or pigments, light stabilizing agents such as UV-absorbers and hindered amine light stabilizers (HALS), antioxidants and other known stabilisers, pH buffers, acid and base scavengers, antiblocking materials such as talc or selected silicas, and materials adsorbent to or reactive with any thermolysis products of laser imaging, surfactants, adhesion promoters, dispersing aids, inks flow/rheology modifiers, humectants, slow drying solvents, fast drying solvents, biocides and the like.

The ink formulation may also comprise further additives. Typically the ink formulation will comprise a binder. The binder may be one or more of a range of water-soluble or amine-stabilized aqueous emulsion polymers suitable for use in water-based coating or ink formulations. As an example, acrylic polymers may be used. Further, the ink formulation may comprise pigments, such as water-dispersible inorganic or organic additives such as calcium carbonate etc. The ink formulation may also comprise one or more of a range of additives, including surfactants or lubricants, such as zinc stearate etc., as well as crosslinking agents, such as ZnO, which may be added to reduce image smearing. Further, the ink formulation may comprise antifoaming agents, such as mineral oil based antifoaming agent. The ink formulation may also comprise dispersing agents and/or film forming modifiers. Further, the ink formulation may comprise light stabilising agents, such as UV absorbers and hindered amines, ink flow/rheology modifiers, drying rate modifiers, such as slow solvents, e.g. diethylene glycol, and plasticisers, and/or adhesion promoters, such as titanate compounds.

Especially, addition of a crosslinking agent such as ZnO is preferred, as such addition has been shown to be able preserve the markability of the ink formulation subsequent to over lamination. According to an embodiment, the ink formulation thus comprises ZnO. Preferably, the ink formulation comprises between 2.5 wt % and 10 wt. %, such as about 5 wt %, of a aqueous solution comprising 30 to 40 wt. % ZnO According to an embodiment, the ink formulation is water-based, i.e. the ink formulation comprises water. As an example, the composition may comprise 5 to 95 wt. % such as 10 to 50 wt. %, of an aqueous-based solvent. The aqueous-based solvent may comprise at least 10 wt % water, preferably at least 50 wt %, such as at least 75 wt %, or at least 95 wt %, water.

Water based formulations has the advantage of being less unhealthy than formulations comprising volatile solvents. An aqueous based ink formulation may further comprise water-miscible organic solvents, such as $C_{1-4}$-alkanols, $C_{2-4}$-polyols, $C_{3-6}$-ketones, $C_{4-6}$-ethers, $C_{2-3}$-nitriles, nitromethane, dimethylsulfoxide, dimethylformamide, dimethylacetamide, methylpyrolidone and sulfolane, whereby $C_{1-4}$-alkanols and $C_{2-4}$-polyols may be substituted with $C_{1-4}$-alkoxy groups.

Examples of $C_{1-4}$-alkanols are methanol, ethanol, propanol, isopropanol or butanol, isobutanol, sec-butanol and tert-butanol. Examples of a $C_{1-4}$-alkoxyderivatives thereof are 2-ethoxyethanol and 1-methoxy-2-propanol. Examples of $C_{2-4}$-polyols are glycol and glycerol. Examples of $C_{3-6}$-ketones are acetone and methyl ethyl ketone. Examples of $C_{4-6}$-ethers are dimethoxyethane, diisopropylethyl and tetrahydrofurane. An example of a $C_{2-3}$-nitrile is acetonitrile. Preferably, the water-miscible organic solvent is selected from the group consisting of $C_{1-4}$-alkanols, $C_{2-4}$-polyols, $C_{3-6}$-ketones, dimethylformamide and dimethylacetamide, whereby $C_{1-4}$-alkanols and $C_{2-4}$-polyols may be substituted with $C_{1-4}$-alkoxy groups.

The polymer covering the substrate is typically a transparent, clear polymer. Typically the polymer is a polyolefin, such as polyethylene (e.g. low-density polyethylene (LDPE)) or polypropylene. The thickness of the thermoplastic polymer layer may be 10 to 60 µm, such as 12 to 50 µm, or 15 to 40 µm. As an example, the thermoplastic polymer layer may be applied to the substrate by melt extrusion. For polyolefins, the temperature of the polymer melt in such melt extrusion may be between 200 and 340° C., such as between 280 and 330° C. While it may be preferred to use a lower temperature for the melt extrusion to reduce discoloration resulting from activation of the TAG, the temperature should preferably be sufficiently high to provide good adhesion of the thermoplastic polymer layer to the substrate. Accordingly, use of the herein disclosed TAG/leuco dyes is advantageous, as they may be covered with a thermoplastic polymer layer at about 300° C. without extensive discoloration, to provide good adhesion of the thermoplastic polymer layer to the substrate.

Coverage of the substrate by the polymer, may also be accomplished by laminating a pre-made polymer film over the surface coated with the ink formulation.

Although, the ink formulation may be compounded into the polymer and co-extruded with the polymer, it is preferred to melt extrude the polymer over the substrate subsequent have being coated with the ink formulation. Even though the polymer is melt extruded over the ink formulation, the ink formulation may anyhow, at least to certain extent, end up in the thermoplastic polymer layer, once the later has solidified.

The ink formulation may be coated onto the substrate by flexographic printing. Various amount of the ink formulation may be applied. The coat weight will affect the markability as well as other parameters of the substrate, including the peeling resistance of the thermoplastic polymer layer.

According to an embodiment, a dry coat weight of 0.5 to 20 g/m², such as 1.0 to 10 g/m², or 2 to 5 g/m² may be employed.

In one embodiment the ink formulation is coated onto one side of the substrate only. In one embodiment the side comprising the ink formulation will be on the exterior side, when being part of a packaging material for liquid food, not intended to being in contact with the liquid food.

The substrate may be of various kinds. According to an embodiment, the substrate may be paper, cardboard, corrugated paper board, paper board, plastic film, ridgid plastic parts, textile, wood, metal, glass, or leather. Further, the substrate may be a laminate comprising layers of paper, cardboard, paper board, plastic film, and/or metal film. Further, when the ink formulation is coated on paper, cardboard, or paper board, the paper, cardboard, paper board may be clay coated.

As a specific example the substrate may be part of a packing material, such as liquid food packaging material. According to an embodiment, such a packing material comprises an innermost layer (optionally being a multi-layer film) of a polyolefin intended to be in contact with the product, such as liquid food. Between the substrate and the innermost layer, a barrier material is arranged. The thermoplastic polymer layer of the substrate is the outermost layer of the liquid food packaging material and whereby not intended to be in contact with the product. The barrier material may be a gas barrier such as an oxygen barrier; a water vapor barrier; light barrier or odour barrier. An example of a barrier material is an aluminium foil or a film containing a metal vapour deposited layer. Other barrier materials are ethylene vinylalcohol copolymer (EvOH) and polyamide (PA). Optionally an adhesive layer in order to promote the adhesion is used. The substrate is selected from paper, cardboard, corrugated paper board, paper board, plastic film, such as a multi-layer film, ridgid plastic parts, textile, wood, metal, glass, or leather. Optionally a bonding layer is arranged between the substrate and the barrier material. The substrate normally has a print and is covered by an outer thermoplastic polymer layer, e.g. LDPE.

The innermost layer may be a low density polyethylene selected from LDPE, LLDPE, mLLDPE and VLDPE or blends thereof. The innermost layer is possible to heat seal. Independently of each other the adhesive layer and the bonding layer may be an ethylene acrylic acid copolymer (EAA), ethylene methacrylic acid copolymer or an LDPE.

A further embodiment relates to a liquid food package comprising such a food packaging material described herein above. The liquid food package may be obtained by a roll fed system where the packaging material is fed the filling machine. FIG. 1 schematically illustrates a roll fed filling machine where the packaging material is sterilized, folded into a tube (61) and longitudinally sealed (63). The longitudinally sealed tube is filled with product (64) before being transversally sealed (65). The sealing may be done by induction sealing or ultrasonic sealing. The sealed package is thereafter cut and finally folded into a package (66). Alternatively the packaging material may be pre-cut before used in the filling machine. Pre-cut packaging material is normally referred to as blanks and has been used for example in manufacturing of packages of gable top type.

In connection with filling the liquid food package with a liquid food and sealing the package, information may be printed on the substrate via activation of the ink formulation. The sterilization of the packaging material is conventionally done by hydrogen peroxide and/or by radiation, such as UV or EB radiation. As the ink formulation is covered by thermoplastic polymer layer, it is protected during the steps in the filling machine where the ink otherwise could be compromised, for example by discoloration.

According to an embodiment the in formulation is coated on substrate having an outermost surface of paper, optionally being clay coated.

According to another embodiment the ink formulation is coated on substrate having an outermost plastic surface, such as a substrate forming part of a ridged plastic part, a substrate being a plastic film, or the substrate being a laminate, wherein the outermost layer is a plastic layer.

A further embodiment relates to a method of obtaining such a substrate as disclosed herein. In such a method, the substrate is coated with the ink formulation. Subsequently, the coated substrate is covered with a thermoplastic polymer layer, such that the ink formulation becomes situated between the substrate and the thermoplastic polymer layer and/or in the thermoplastic polymer layer. Aspects of the coating as well as the covering have been provided herein above.

Although, amine salts of an organic metal compound comprising boron or silicone according to formula (I) and amine neutralized polyalkylnaphthalene polysulphonic acid derivatives are preferred thermo activated acid generator, also other thermo activated acid generator (TAG) may be employed to obtain markable substrates. In embodiments, wherein such alternative TAG:s are to be employed, the components of the ink formulation, including the TAG and the halochromic leuco dye, should preferably be selected such that a marking with an ODB of at least 0.7 may be achieved by irradiating the substrate with an laser having an operating wavelength in the range 780 to 2500 nm. Further, the components of the ink formulation, including the TAG and the halochromic leuco dye, should be selected such that the ink formulation may be covered by a thermoplastic polymer layer, such that the ink formulation is situated between the substrate and the thermoplastic polymer layer and/or in the thermoplastic polymer layer, without discoloring the substrate. Using the 1976 CIE (L*, a*, b*) space, the color difference, i.e $\Delta E$, after coverage by the thermoplastic polymer layer may be expressed as $\Delta E^*_{ab} = \sqrt{(L_2^* - L_1^*)^2 + (a_2^* - a_1^*)^2 + (b_2^* - b_1^*)^2}$, wherein $L^*_1$, $a^*_1$ and $b^*_1$ refer to the color, according to the 1976 CIE (L*, a*, b*) space, of the substrate before being covered by the thermoplastic polymer layer, and $L^*_2$, $a^*_2$ and $b^*_2$, according to the 1976 CIE (L*, a*, b*) space, refer to the color of the substrate after having been covered by the thermoplastic polymer layer. An embodiment relates to a method for obtaining a markable substrate, suitable for use in packaging materials. In such a method, the substrate is coated with an ink formulation comprising a thermo activated acid generator (TAG) and a halochromic leuco dye. Subsequently, the substrate is covered by a thermoplastic polymer layer, such that the ink formulation is situated between the substrate and the thermoplastic polymer layer and/or in the thermoplastic polymer layer. The thermo activated acid generator (TAG) and the halochromic leuco dye are selected such that the color difference, i.e. $\Delta E^*_{ab} = \sqrt{(L_2^* - L_1^*)^2 + (a_2^* - a_2^*)^2 + (b_2^* - b_1^*)^2}$, according to the 1976 CIE (L*, a*, b*) space, resulting from the step of covering said ink formulation with a thermoplastic polymer layer, is less than 10, such as less than 4, or even less than 2. Further, the thermo activated acid generator (TAG) and the halochromic leuco dye, as well as other constituents of the ink formulation, are selected such that a marking with an ODB of at least 0.7 may be achieved by irradiating the substrate with a laser having an operating wavelength in the range 780 to 2500 nm.

A further embodiment relates to a substrate obtainable by a method disclosed herein, which substrate may be marked to obtain a marking with an ODB of at least 0.7 by irradiating the substrate with a laser having an operating wavelength in the range 780 to 2500 nm.

A further embodiment relates to method for marking such a substrate as disclosed herein. In such a method those parts of the coated substrate covered by a thermoplastic polymer layer, where a marking is intended, are irradiated in order to generate a marking.

According to an embodiment, only parts of the coating are irradiated whereby a marking with a defined pattern may be obtained. Typically, although not necessary, at least part of the substrate is provided with a flat coating in such an embodiment. Upon irradiating such a flat coating, a marking will appear where the coating is irradiated. By only irradiating parts of the flat coating a marking with a defined pattern may be obtained. Figuratively speaking, this may be seen as writing, or etching, with a laser beam in the coating.

According to another embodiment, the ink formulation is coated in a defined pattern. In marking such a coated substrate, the entire coating, or at least part of the defined pattern, is irradiated in order to generate a marking. Figuratively speaking, this may be seen as developing a coated pattern in order to obtain a marking.

In marking of substrates, the color of the substrate, on which the ink formulation is coated, is typically light in order for the marking, typically appearing as marking with dark color, to be contrasting and clearly visible. For dark substrate, a light pigment may be included in the ink formulation. The substrate may be transparent. Examples of transparent substrates include plastic films and substrates of glass. Further, the substrate may have low transparency or even be essentially non-transparent. Typical examples of substrates having low transparency or even being essentially non-transparent are substrates of paper or substrates comprising paper, such as packaging laminates. As the marking typically will have a dark color, the lightness (L*) of the substrate should preferably be high in order for the marking to be contrasting to the background and thereby clearly visible. A blackish, a dark brownish, or a dark grayish marking will be clearly visible on a contrasting white or light gray substrate, such as an uncolored or clay coated paper substrate.

In order to allow for rapid and precise marking, the substrate is typically irradiated by a laser. In addition to lasers, also diodes, fiber coupled diode array systems or diode array systems may be used to generate a marking. As an example, diode array systems, which may emit both coherent and non-coherent light, are particularly suitable for use in high speed continuous or 'on the fly' imaging.

While others wavelength, such as wavelengths of about 10 μm, may be used as well, it is preferred if the irradiation source, e.g. the laser or the diode array system, has an operating in the wavelength range of 700 to 2500 nm. Examples of lasers having an operating in the wavelength range of 700 to 2500 nm are Nd:YAG lasers and NIR fiber lasers.

According to one embodiment, wherein the substrate is part of a liquid food package, the substrate is marked in connection with filling the liquid food package with a liquid food.

Another embodiment relates to a marked substrate. Such a marked substrate is obtainable as just described.

Without further elaboration, it is believed that one skilled in the art can, using the preceding description, utilize the present invention to its fullest extent. The preferred specific embodiments described herein are, therefore, to be construed as merely illustrative and not limitative of the remainder of the description in any way whatsoever. Further, although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc do not preclude a plurality.

Experimental

BRIEF DESCRIPTION OF THE DRAWINGS

FIG. 1, schematically illustrates a roll fed filling machine.

The following examples are mere examples and should by no mean be interpreted to limit the scope of the invention. Rather, the invention is limited only by the accompanying claims.

Ink Formulations

Various ink formulations, as indicated below, were prepared by pre-mixing the indicated components using a Silverson mixer. The premixed components were then milled using an Eiger-Torreance bead mill until a particle size of sub-5 microns had been obtained, as measured using a Hegmann grind gauge. The marking properties of the various ink formulations were than evaluated.

The TAG employed in the formulations 1 to 8 and 10, respectively, was obtained as described in WO 2006/108745 (cf. Example 3 and 5; in preparing tri-n-butylammonium borodisalicylate, the procedure of example 3, except for replacing tri-pentylamine with tributylamine, was employed). The nanopowder r-ITO employed had a lightness ($L^*$) of less than 50 and a In:Sn weight ratio of 90:10.

Other constituents in the various ink formulations were obtained from commercial suppliers as indicated below.

Joncryl LMV7085 (ex. BASF)—styrene-acrylic resin solution binder
Dispelair CF49 (ex. Blackburn Chemicals)—mineral oil antifoam
Dispex A40 (ex. BASF)—solution of an ammonium salt of an acrylic polymer in water—dispersing agent.
BYK-348—(ex. BYK) silicone surfactant
DEG—Diethylene glycol—retarder
ETAC (ex. Yamada)—halochromic leuco dye colour former.
Benzillic acid/Boric acid/Tributylamine (Tri-n-butylammonium borodibenzilate—TA
r-ITO nanopowder (NIR absorber)
Joncryl 8052 (ex. BASF)—film-forming acrylic emulsion binder
Aqueous Zinc Oxide solution (30-40 wt. %; ex. BASF)—crosslinking agent
Joncryl 90 (ex. BASF)—styrene-acrylic copolymer emulsion binder.
Joncryl 1180 (ex. BASF)—styrene-acrylic copolymer emulsion binder.
Elvacite 2669 (ex. Lucite International)—water soluble acrylic copolymer binder.
Agitan 350 (ex. Munzing)—non-oil, non-siloxane defoamer.

Comparative Formulation 1

| Joncryl LMV7085 | 28 wt % |
| Water | 21 wt % |
| Dispex A40 | 0.5 wt % |
| r-ITO | 1 wt % |
| ETAC (halochromic leuco dye) | 16.5 wt % |
| Benzyl p-hydroxybenzoate (TAG) | 33 wt % |

Comparative Formulation 2

Same composition as comparative formulation 1 except for ETAC being replaced by Wincon 2

Formulation 1

| Joncryl LMV7085 | 15 wt % |
| Water | 15 wt % |
| Dispelair CF49 | 0.5 wt % |
| Dispex A40 | 0.2 wt % |
| BYK-348 | 0.4 wt % |
| DEG | 0.4 wt % |
| ETAC (halochromic leuco dye) | 17 wt % |
| tri-n-butylammonium borodibenzilate (TAG) | 34 wt % |
| r-ITO | 2.5 wt % |
| Joncryl 8052 | 10 wt % |
| Aqueous Zinc Oxide solution (30-40 wt %) | 5 wt % |

Formulation 2

| Joncryl LMV7085 | 26 wt % |
| Water | 17 wt % |
| Dispelair CF49 | 0.5 wt % |
| Dispex A40 | 0.2 wt % |
| DEG | 0.8 wt % |
| ETAC (halochromic leuco dye) | 20 wt % |
| tri-n-butylammonium borodibenzilate (TAG) | 28 wt % |
| r-ITO | 2.5 wt % |
| Aqueous Zinc Oxide solution (30-40 wt %) | 5 wt % |

Formulation 3

| Joncryl LMV7085 | 27 wt % |
| Water | 10 wt % |
| Dispelair CF49 | 0.5 wt % |
| Dispex A40 | 0.2 wt % |
| DEG | 0.8 wt % |
| ETAC (halochromic leuco dye) | 15 wt % |
| tri-n-butylammonium borodisalicylate[1] (TAG) | 39 wt % |
| r-ITO | 2.5 wt % |
| Aqueous Zinc Oxide solution (30-40 wt %) | 5 wt % |

[1]comprising 30% water

Formulation 4

| Joncryl LMV7085 | 31.8 wt % |
| Water | 20 wt % |
| Dispelair CF49 | 0.5 wt % |
| Dispex A40 | 0.2 wt % |
| ETAC (halochromic leuco dye) | 15 wt % |
| Tri-allylammonium borophenyldibenzilate (TAG) | 30 wt % |
| r-ITO | 2.5 wt % |

Formulation 5

| | |
|---|---|
| Joncryl LMV7085 | 31.8 wt % |
| Water | 20 wt % |
| Dispelair CF49 | 0.5 wt % |
| Dispex A40 | 0.2 wt % |
| ETAC (halochromic leuco dye) | 15 wt % |
| tri-n-butylammonium borodibenzilate (TAG) | 30 wt % |
| r-ITO | 2.5 wt % |

Formulation 6

| | |
|---|---|
| Joncryl LMV7085 | 20 wt % |
| Water | 16.8 wt % |
| Dispelair CF49 | 0.5 wt % |
| Dispex A40 | 0.2 wt % |
| ETAC (halochromic leuco dye) | 15 wt % |
| tri-n-butylammonium borodibenzilate (TAG) | 30 wt % |
| r-ITO | 2.5 wt % |
| Joncryl 90 | 10 wt % |
| Aqueous Zinc Oxide solution (30-40 wt %) | 5 wt % |

Formulation 7

| | |
|---|---|
| Joncryl LMV7085 | 19 wt % |
| Water | 16.8 wt % |
| Dispelair CF49 | 0.5 wt % |
| Dispex A40 | 0.2 wt % |
| Diethylene glycol | 1 wt % |
| ETAC (halochromic leuco dye) | 15 wt % |
| tri-n-butylammonium borodisalicylate (TAG) | 30 wt % |
| r-ITO | 2.5 wt % |
| Joncryl 1180 | 10 wt % |
| Aqueous Zinc Oxide solution (30-40 wt %) | 5 wt % |

Formulation 8

| | |
|---|---|
| Joncryl LMV7085 | 27.5 wt % |
| Water | 18 wt % |
| Dispelair CF49 | 0.5 wt % |
| Dispex A40 | 0.2 wt % |
| DEG | 0.8 wt % |
| ETAC (halochromic leuco dye) | 20 wt % |
| tri-n-butylammonium borodibenzilate (TAG) | 28 wt % |
| r-ITO | 2.5 wt % |
| Aqueous Zinc Oxide solution (30-40 wt %) | 2.5 wt % |

Formulation 9

| | |
|---|---|
| Nacure 155[1] (TAG) | 30 wt % |
| Elvacite 2669 | 6 wt % |
| 25% Ammonia Sol. | 4 wt % |
| Agitan 350 | 0.5 wt % |
| propan-2-ol | 5 wt % |
| Water | 37 wt % |
| ETAC (halochromic leuco dye) | 15 wt % |
| r-ITO | 2.5 wt % |

[1] a dinonylnaphthalene disulphonic acid derivative

Formulation 10

| | |
|---|---|
| Joncryl LMV7085 | 20.0 wt % |
| Water | 16.8 wt % |
| Dispex A40 | 0.2 wt % |
| Dispelair CF49 | 0.5 wt % |
| r-ITO | 2.5 wt % |
| Wincon 2 | 15.0 wt % |
| tri-n-butylammonium borodibenzilate (TAG) | 30.0 wt % |
| Joncryl 90 | 10.0 wt % |
| Aqueous Zinc Oxide solution (30-40 wt %) | 5.0 wt % |

The various ink formulations were each applied to clay coated paperboard using a flexographic printing technique, in the form of three different Anilox handheld flexiproofers with increasing cell volumes of 7.75, 10 and 18 cm$^3$/m$^2$, respectively. The laser imaging performance, i.e. the markability, of coated substrates were determined by imaging using a 5 W, 1550 nm fibre laser fitted with a galvo mirror based imaging head, linked to a PC. Imaging was performed employing a fluence range of 0 to 5 J/cm$^2$ (100% speed). The maximum ODB obtained is provided in table 1 to 3.

Further, the coated substrates were over laminated with LDPE (12 g/m$^2$) at 325° C. and a lamination speed of 500 m/min.

The color difference, i.e. $\Delta E^*_{ab} = \sqrt{(L_2^* - L_1^*)^2 + (a_2^* - a_1^*)^2 + (b_2^* - b_1^*)^2}$, according to the 1976 CIE (L*, a*, b*) space, between the coated substrate and the uncoated virgin (white) substrate to which the coating was applied was determined using a SpectroEye spectrophotometer/densitometer from GretagMacbeth (Illumination type: D65; Standard Observer: 2°). The lower the value of ΔE, the closer to the original uncoated substrate the coated substrate is and therefore the whiter it looks. The color difference obtained with the various ink formulations are provided in table 1 to 3.

In addition, the markability of over laminated substrates were determined by imaging using a 5 W, 1550 nm fibre laser fitted with a galvo mirror based imaging head, linked to a PC. Imaging was performed employing a fluence range of 0 to 5 J/cm$^2$ (100% speed). The maximum ODB (Optical density black) obtained with the over laminated substrates is provided in table 1 to 3, wherein:

BHB=Benzyl p-hydroxybenzoate

BABoTBA=Benzillic acid/Boric acid/Tributylamine

BASiPhTAA=Benzillic acid/phenylsilane/Triallylamine

SABoTBA=Salicyclic acid/Boric acid/Tributylamine

ETAC=2'-anilino-6'-[ethyl(p-tolyl)amino]-3'-methylspiro[isobenzofuran-1(3H), 9'-[9H]xanthene]-3-one Wincon 2=6'-(dibutylamino)-3'-methyl-2'-(phenylamino)-3H-spiro[isobenzofuran-1,9'-xanthen]-3-one

TABLE 1

7.75 Anilox

| | | | | ODB | |
|---|---|---|---|---|---|
| Formulation | TAG | Leuco dye | ΔE | unlaminated | laminated |
| Comp. 2 | BHB | Wincon2 | 16.8 | N.D. | N.D. |
| Comp. 1 | BHB | ETAC | 15.48 | 1.23 | 0.84 |
| 10 | BABoTBA | Wincon2 | 7.73 | 0.53 | 0.4 |
| 4 | BASiPhTAA | ETAC | 0.49 | 0.69 | 0.21 |
| 5 | BABoTBA | ETAC | 0.88 | 0.75 | 0.35 |
| 6 | BABoTBA | ETAC | 1.69 | 0.6 | 0.38 |
| 7 | SABoTBA | ETAC | 2.09 | 0.65 | 0.37 |
| 1 | BABoTBA | ETAC | 1.83 | 0.66 | 0.34 |
| 2 | BABoTBA | ETAC | 1.69 | 0.79 | 0.56 |
| 8 | BABoTBA | ETAC | 1.32 | 0.94 | 0.52 |
| 9 | Nacure 155 | ETAC | 1.09 | 0.54 | 0.23 |
| 3 | SABoTBA | ETAC | 2.11 | 0.73 | 0.68 |

TABLE 2

10 Anilox

| Formulation | TAG | Leuco dye | ΔE | ODB unlaminated | ODB laminated |
|---|---|---|---|---|---|
| Comp. 2 | BHB | Wincon2 | 17.59 | N.D. | N.D. |
| Comp. 1 | BHB | ETAC | 16.02 | 1.75 | 1.27 |
| 10 | BABoTBA | Wincon2 | 10.36 | 0.74 | 0.51 |
| 4 | BASiPhTAA | ETAC | 0.81 | 0.73 | 0.31 |
| 5 | BABoTBA | ETAC | 1.08 | 1 | 0.45 |
| 6 | BABoTBA | ETAC | 2.02 | 0.66 | 0.47 |
| 7 | SABoTBA | ETAC | 2.52 | 1.05 | 0.51 |
| 1 | BABoTBA | ETAC | 2.27 | 0.84 | 0.59 |
| 2 | BABoTBA | ETAC | 2.78 | 0.95 | 0.8 |
| 8 | BABoTBA | ETAC | 2.12 | 1.33 | 0.66 |
| 9 | Nacure 155 | ETAC | 1.21 | 0.65 | 0.31 |
| 3 | SABoTBA | ETAC | 2.22 | 0.86 | 0.52 |

TABLE 3

18 Anilox

| Formulation | TAG | Leuco dye | ΔE | ODB unlaminated | ODB laminated |
|---|---|---|---|---|---|
| Comp. 2 | BHB | Wincon2 | 18.21 | >1.8 | >1.5 |
| Comp. 1 | BHB | ETAC | 16.74 | 1.75 | 2.91 |
| 10 | BABoTBA | Wincon2 | 11.76 | 1 | 0.65 |
| 4 | BASiPhTAA | ETAC | 0.98 | 0.9 | 0.35 |
| 5 | BABoTBA | ETAC | 1.54 | 1.2 | 0.55 |
| 6 | BABoTBA | ETAC | 2.11 | 0.9 | 0.55 |
| 7 | SABoTBA | ETAC | 2.99 | 1.3 | 0.6 |
| 1 | BABoTBA | ETAC | 2.53 | 1.15 | 0.9 |
| 2 | BABoTBA | ETAC | 2.56 | 1.1 | 1.05 |
| 8 | BABoTBA | ETAC | 2.48 | 1.5 | 0.6 |
| 9 | Nacure 155 | ETAC | 1.68 | 0.75 | 0.4 |
| 3 | SABoTBA | ETAC | 3.89 | 1.15 | 1 |

Although the ink formulations comprising BHB provided substrates with good markability, i.e. the markings with high ODB values could be obtained, substrates coated with such ink formulations are prone to discoloration during lamination as the ink formulation is heat activated (cf. ΔE in Table 1 to 3).

As can be seen from table 1 to 3, replacing BHB, being the TAG typically used in the art, with an amine salt of an organic metal compound comprising boron or silicone or amine neutralized polyalkylnaphthalene polysulphonic acid derivative provided substrates less susceptible for discoloration during lamination (cf. ΔE in Table 1 to 3). Furthermore, such substrates anyhow did display good markability subsequently. Thus, substrate coated with an ink formulation, comprising an amine salt of an organic metal compound comprising boron, or silicone or amine neutralized polyalkylnaphthalene polysulphonic acid derivative, and a halochromic leuco dye, are well suited for over lamination by a polymer and subsequent marking, e.g. imaging.

Furthermore, it is apparent from table 1 to 3 that presence of ZnO provides the substrates with improved markability subsequent to the over lamination (cf. formulation 1, 2 and 8), as the maximum ODB obtainable subsequent to the over lamination is less reduced if ZnO is present.

Application of red ink by a pipette to the laminated substrates subsequent to imaging did not result in any visible penetration of the red ink into the paperboard. The possible penetration was further assessed using a PIAS II device. Penetration was not seen for any of the substrates, confirming that they may be marked without disrupting the outermost protecting polymer layer.

The laminated substrates may also be assessed in accordance to ASTM F1929-98 (2004) Standard Test Method for Detecting Seal Leaks in Porous Medical Packaging by Dye Penetration.

The invention claimed is:

1. A method of obtaining a substrate with an ink formulation, comprising the steps of:
providing a substrate;
coating said substrate with an ink formulation, said ink formulation comprising a thermo activated acid generator (TAG) and a halochromic leuco dye, said thermo activated acid generator being selected form the group consisting of: an amine salt of an organic metal compound comprising boron or silicone according to formula I:

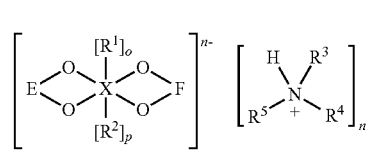

(I)

wherein
X is silicon or boron;
n is an integer greater than or equal to 1 and less than or equal to 5;
o is an integer being 0 (zero) or 1;
p is an integer being 0 (zero) or 1;
E and F are each selected from the group consisting of:

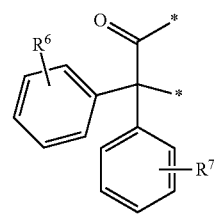

a

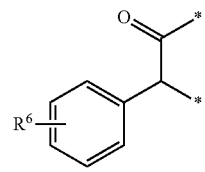

b

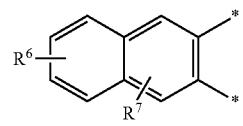

c

d

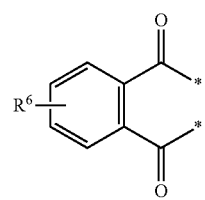

e

-continued

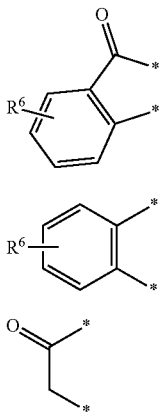

f g g wherein each R6 and R7 are individually selected from the group consisting of hydrogen, C1-4-alkyl, C1-4-alkoxy, halogen, amino and carboxy;

whenever X=silicon, then o=1, p=0, and RI is aryl, aralkyl or C1-4-alkyl, or o=1, p=1, and R1 and R2 together form a residue selected from the group consisting of a, b, c, d, e, f, g and h;

whenever X=boron, then o=0 and p=0; and R3, R4 and R5 are individually selected from the group consisting of hydrogen, C1-12-alkyl, C1-6-hydroxyalkyl, allyl, aralkyl and arylsulfonyl, in which aralkyl or arylsulfonyl may be substituted with C1-4-alkyl; or R3 and R4 together with the nitrogen to which they are attached form a morpholino or piperidine ring, and R5 is selected from the group consisting of hydrogen, C1-12-alkyl, C1-6-hydroxyalkyl, allyl, aralkyl and arylsulfonyl, in which aralkyl or arylsulfonyl can be substituted with C1-4-alkyl; and amine neutralized polyalkylnaphthalene polysulphonic acid derivatives;

covering said coated substrate with a thermoplastic polymer layer, such that the ink formulation is situated between the substrate and the thermoplastic polymer layer and/or in the thermoplastic polymer layer, wherein said step of covering said ink formulation with said thermoplastic polymer layer is performed by melt extrusion: wherein said polymer is a polyolefin, and the temperature of the polymer melt in said melt extrusion ranges from 200 to 340° C.

2. The method according to claim 1, wherein said halochromic leuco dye is a fluoran comprising 2'-anilino-6'-[ethyl(p-tolyl(amino)-3'-methylspiro[isobenzofuran-1(3H), 9'-[9H]xanthene)-3-one.

3. The method according to claim 1, wherein said ink formulation further comprises a near infrared absorber comprising indium tin oxide.

4. The method according to claim 1, wherein said ink formulation further comprises a crosslinking agent comprising ZnO.

5. The method according to claim 1, wherein said polymer comprises polyethylene or polypropylene.

6. The method according to according to claim 1, wherein the thickness of said thermoplastic polymer layer is 10 to 60 µm.

7. The method according to claim 1, wherein said substrate is paper, cardboard, corrugated paper board, paper board, plastic, ridged plastic parts, textile, wood, metal, glass, or leather.

8. The method according to claim 1, wherein said ink formulation further comprises a binder, a light stabilizing agent, an ink flow/rheology modifier, a drying rate modifier, and/or an adhesion promoter.

9. The method according to claim 1, wherein said ink formulation is water-based.

10. The method according to claim 1, wherein the temperature of the polymer melt in said melt extrusion ranges from 280 to 330° C.

11. The method according to claim 1, wherein said step of coating the substrate is performed by flexographic printing.

12. The method according to claim 1, further comprising: irradiating those parts of the coated substrate covered by a thermoplastic polymer layer, where a marking is intended, in order to generate a marking.

13. The method according to claim 12, wherein only parts of the coating are irradiated in order to generate a marking.

14. The method according to claim 13, wherein the ink formulation is coated in a defined pattern and at least parts of the defined pattern is irradiated in order to generate a marking.

15. The method according to claim 12, wherein the substrate is irradiated with an irradiation source selected from the group consisting of a laser, a diode, a fiber coupled diode array system, or a diode array system.

16. The method according to claim 15, wherein the irradiation source has an operating wavelength in the range of 780 to 2500 nm.

17. The method according to claim 16, wherein the irradiation source is a Nd:YAG laser or a NIR fiber laser.

* * * * *